United States Patent
Heinzelman et al.

(10) Patent No.: US 9,232,475 B2
(45) Date of Patent: Jan. 5, 2016

(54) WIRELESS SENSOR NETWORK WAKE-UP RANGE EXTENSION VIA ENERGY HARVESTING AND EDGE DEVICES

(71) Applicant: UNIVERSITY OF ROCHESTER, Rochester, NY (US)

(72) Inventors: Wendi Heinzelman, Pittsford, NY (US); He Ba, Rochester, NY (US); Li Chen, Rochester, NY (US)

(73) Assignee: UNIVERSITY OF ROCHESTER, Rochester, NY (US)

( * ) Notice: Subject to any disclaimer, the term of this patent is extended or adjusted under 35 U.S.C. 154(b) by 128 days.

(21) Appl. No.: 14/199,606

(22) Filed: Mar. 6, 2014

(65) Prior Publication Data

US 2014/0254445 A1 Sep. 11, 2014

Related U.S. Application Data

(60) Provisional application No. 61/775,005, filed on Mar. 8, 2013.

(51) Int. Cl.
*H04W 52/02* (2009.01)

(52) U.S. Cl.
CPC ...... *H04W 52/0229* (2013.01); *H04W 52/0235* (2013.01)

(58) Field of Classification Search
None
See application file for complete search history.

(56) References Cited

U.S. PATENT DOCUMENTS

| 8,700,924 B2* | 4/2014 | Mian | G01D 9/005 370/311 |
| 2009/0059827 A1* | 3/2009 | Liu | H04W 76/048 370/311 |
| 2011/0051641 A1* | 3/2011 | Pan | H04Q 9/00 370/311 |
| 2011/0172847 A1* | 7/2011 | Chen | G05F 1/67 700/298 |
| 2011/0248846 A1* | 10/2011 | Belov | H04Q 9/00 340/539.1 |
| 2012/0255349 A1* | 10/2012 | Pop | B60C 23/0413 73/146.5 |
| 2012/0256492 A1* | 10/2012 | Song | H02J 1/102 307/66 |
| 2013/0121176 A1* | 5/2013 | Addepalli | H04L 67/12 370/252 |
| 2013/0124883 A1* | 5/2013 | Addepalli | G06F 1/28 713/310 |
| 2013/0265140 A1* | 10/2013 | Gudan | G06K 7/10207 340/10.3 |
| 2014/0011543 A1* | 1/2014 | Li | H04W 52/0206 455/561 |

* cited by examiner

*Primary Examiner* — Brian Roberts
(74) *Attorney, Agent, or Firm* — William Greener; Bond, Schoeneck & King, PLLC

(57) ABSTRACT

An enhanced, ultra low power passive wake-up radio-based sensor includes a passive wake-up radio-based sensor node having an energy harvester and low power wake-up circuit to improve the wake-up range for passive wake-up radio sensor nodes without the need for local power. The wake-up sensor may additionally include a transmitter for providing a wake-up signal to nodes that are outside the wake-up range of a base.

17 Claims, 16 Drawing Sheets

(a) WuTx: RFID Reader and Powercast; WuRx: WISP-Mote (b) WuTx: RFID Reader and Powercast; WuRx: EH-WISP-Mote

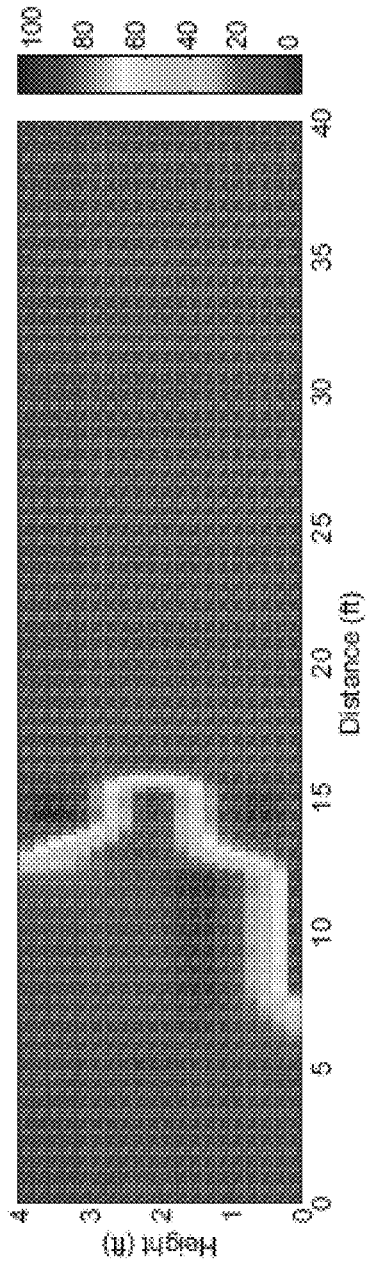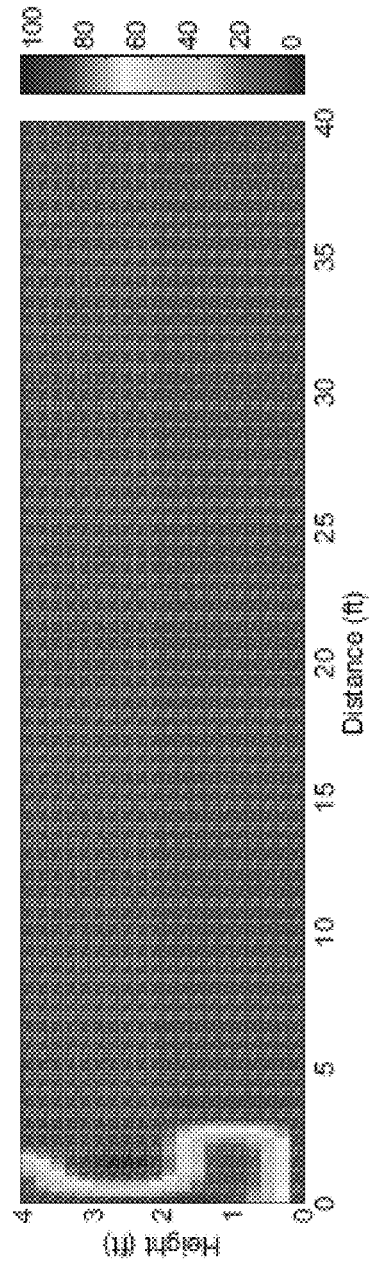
FIG. 7A and B

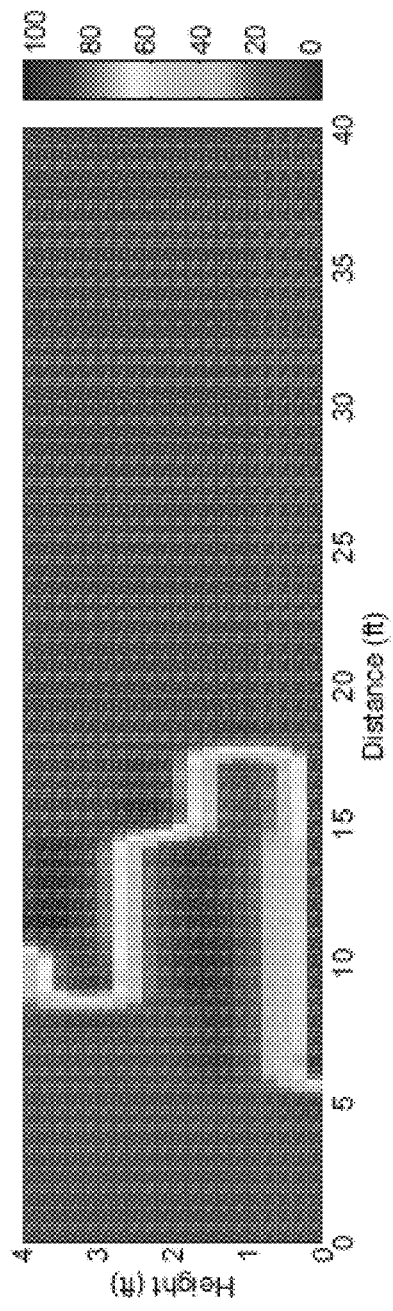
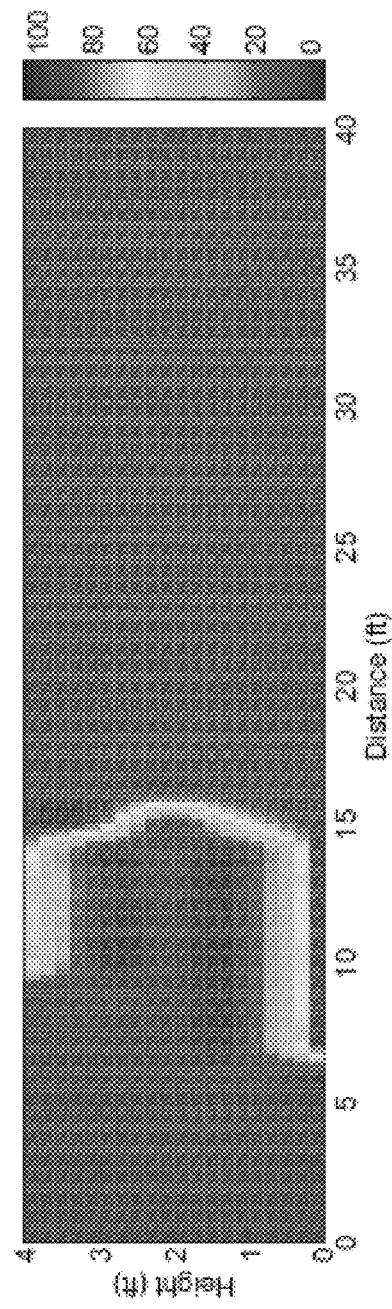
FIG. 7C and D

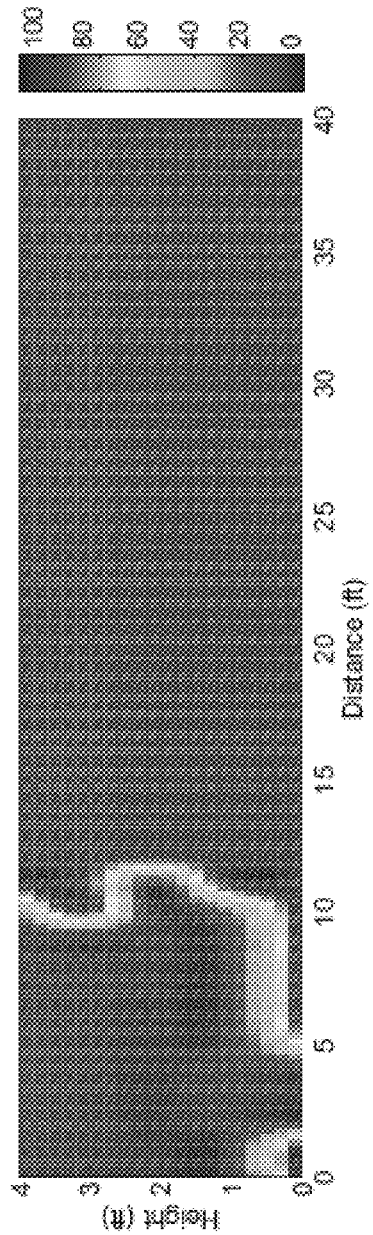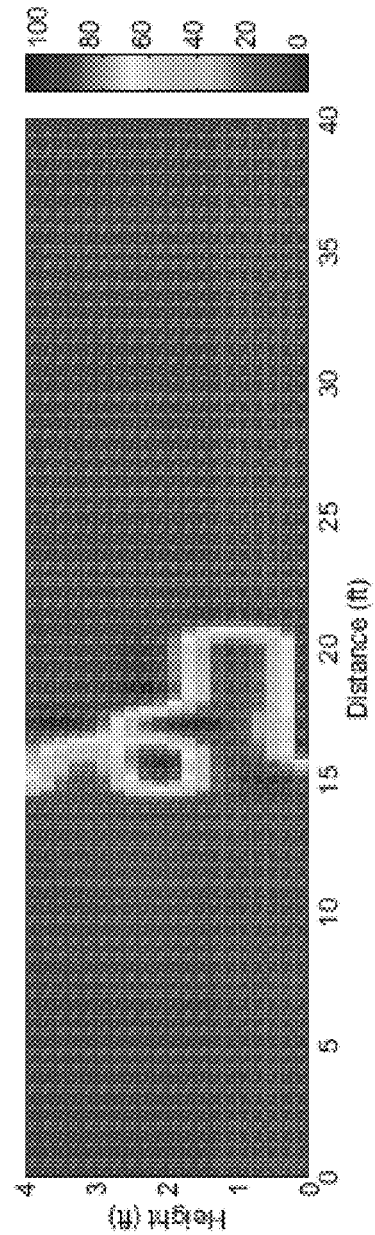
FIG. 7E and F

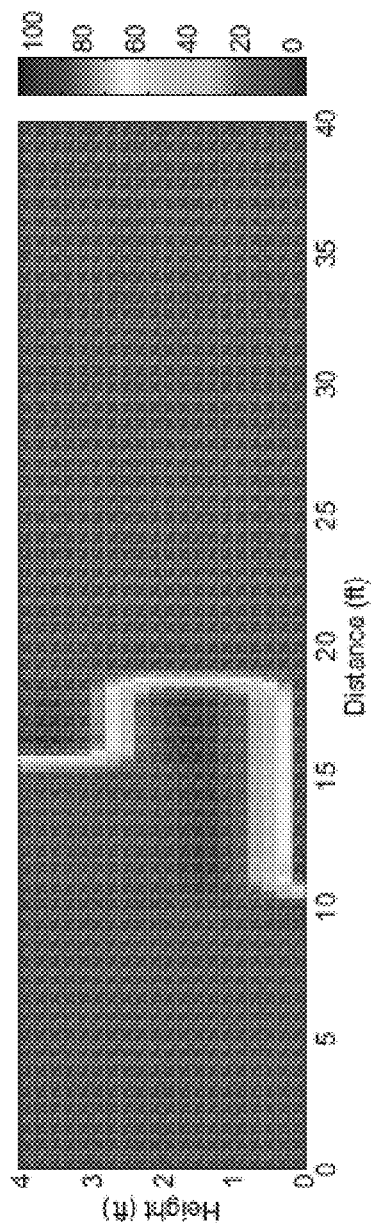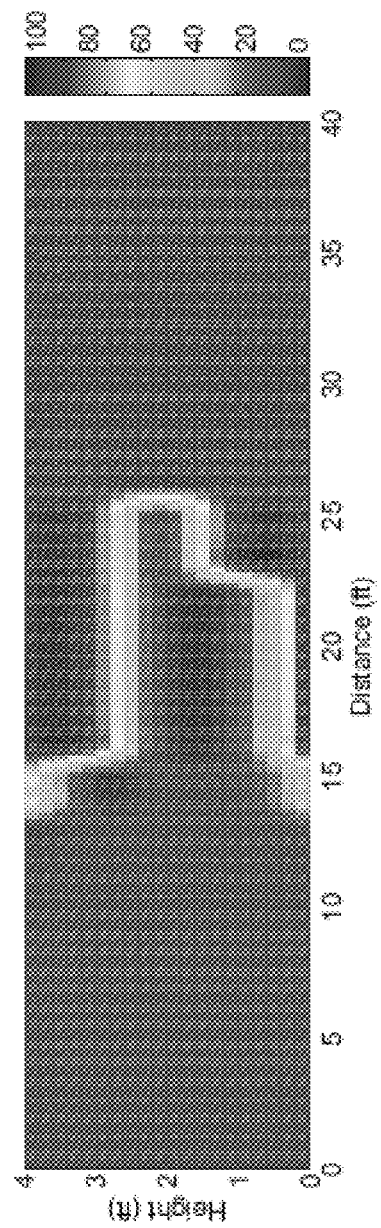
(g) WuTx: RFID Reader; WuRx: REACH-Mote
(h) WuTx: Powercast; WuRx: REACH-Mote
FIG. 7G and H (i) WuTx: RFID Reader and Powercast; WuRx: REACH-Mote

WIRELESS SENSOR NETWORK WAKE-UP RANGE EXTENSION VIA ENERGY HARVESTING AND EDGE DEVICES

CROSS-REFERENCE TO RELATED APPLICATIONS

The present application claims priority to U.S. Provisional Application No. 61/775,005, filed on Mar. 8, 2013.

BACKGROUND OF THE INVENTION

1. Field of the Invention

The present invention relates to wireless sensor networks and, more specifically, network wake-up range extension using edge devices that broadcast wake-up signals or provide auxiliary communication channels.

2. Description of the Related Art

A wireless sensor network (WSN) consists of a set of sensor nodes organized into a cooperative network. Each sensor node may contain processing units (e.g., a microprocessor, some DSP processors, or even a CPU), multiple types of memory to store programs, collected data, or even an operating system, multiple sensors to obtain data from the environment (e.g., a temperature sensor, a humidity sensor, etc.), a power source (batteries or an energy harvesting component) and a wireless transceiver. There are typically one or more data sinks in the network that must gather the data sensed by the nodes.

Prolonging the network lifetime is one of the key challenges in WSNs. Most sensor nodes are battery powered, and due to the size and/or cost constraints, the battery life of each sensor node is limited. As a WSN is a self-organizing ad-hoc network, the network lifetime is affected by the communication traffic of the network, the communication protocols, and the battery life of each sensor node.

One method to improve the network lifetime is to duty cycle the sensor nodes, such that the nodes are put into a sleep state periodically. However, this approach requires accurate synchronization among the sensor nodes, as one node can only transmit data to another while both sensor nodes are active. In addition, unnecessary idle listening by receivers that are not the target of a transmission wastes energy. Low power listening (LPL), also called preamble sampling, is another solution to improve network lifetime for WSNs. LPL aims to reduce idle listening in asynchronous protocols by shifting the burden of synchronization to the sender. However, idle listening is not eliminated. For both synchronous duty cycling and low power listening approaches, reducing the duty cycle of a node can increase its lifetime at the cost of increasing the delay in data delivery and reducing the packet delivery ratio.

The use of a wake-up radio (WuR) is another approach to increase network lifetime by employing additional wakeup radio hardware. A wake-up transmitter (WuTx) initializes the transmission by sending a wake-up signal. When a wakeup receiver (WuRx) receives this signal, it will trigger the sensor node to awaken it from its sleeping mode to start data communication. This on-demand wake-up can save the energy wasted by idle listening. Moreover, the wake-up radio approach has potential advantages over duty cycling in terms of delay, collision, overhead and protocol complexity.

There are two types of wake-up radios being developed: active wake-up radios and passive wake-up radios. An active wake-up radio sensor node requires a power supply for the wake-up circuit, but usually has a relatively long wake-up range. On the other hand, a passive wake-up radio sensor node only utilizes the energy harvested from the wake-up radio and does not dissipate any energy from the battery. However, as the energy harvested by the wake-up circuit is limited, passive wake-up radio sensor nodes operate over a shorter range of distances compared to active wake-up radio sensor nodes.

Radio-frequency identification (RFID) technology is one of the feasible approaches to achieve a passive wake-up radio. RFID systems use RF electromagnetic fields to communicate with tags for the purpose of identification. RFID systems are widely used for managing assets and people, as well as for tracking inventory by attaching tags to merchandise. RFID systems are generally composed of RFID tags, which store the ID information, and an RFID reader, which transmits the electromagnetic energy to power the tags as well as to access or modify the tag ID information. There are three types of RFID tags: passive tags, active tags and battery-assisted passive tags. Among these three types of RFID tags, passive RFID tags have the advantage of small size and low cost, and they have close to zero maintenance. Because of these advantages, passive RFID systems have been rapidly deployed in recent years. In particular, passive ultra-high frequency (UHF) RFID readers and tags communicate in the frequency band from 860 MHz to 960 MHz, where the tags communicate by backscattering the radio waves they receive from RFID readers RFID has a well-defined communication protocol and uses energy harvesting to enable this communication. However, an RFID receiver (i.e., a tag) used in a wake-up radio sensor node can only achieve a relatively short wake-up range compared to the communication range of the sensor node. As a sensor node with a WuRx can start communication only after it is awoken, a longer wakeup range can improve the communication efficacy of a WSN equipped with WuRs. In addition, a longer range enables a wider range of WSN applications to benefit from the use of WuRs. Thus, there is a need for low energy consumption wake-up radio systems that can operate at longer ranges.

BRIEF SUMMARY OF THE INVENTION

The present invention comprises edge device to help with asynchronous communication systems. The edge device may be used in circumstances where the wake-up signal from a base station cannot reach an end device, but the communication from the end device can go directly to the base station so the edge device provides the booster signal for the wake-up signal. The present invention thus includes a single or multi-hop wake-up sensor that can receive and respond to a wake-up signal at an extended range and/or that can facilitate the transmission of a wake-up signal to additional edge devices that are outside of the normal wake-up range of the base station but still within data communication range.

BRIEF DESCRIPTION OF THE SEVERAL VIEWS OF THE DRAWING(S)

The present invention will be more fully understood and appreciated by reading the following Detailed Description in conjunction with the accompanying drawings, in which:

FIG. 7A through 7I are graphs of the wake-up delay (in seconds) for different combinations of WuTxs (RFID Reader, Powercast, and combination of RFID Reader and Powercast) and WuRxs (WISP-Mote, EH-WISP-Mote and REACH-Mote) where the delay limit of 100 seconds is used to represent the no wake-up locations;

DETAILED DESCRIPTION OF EXEMPLARY EMBODIMENTS OF THE INVENTION

Figure 1:
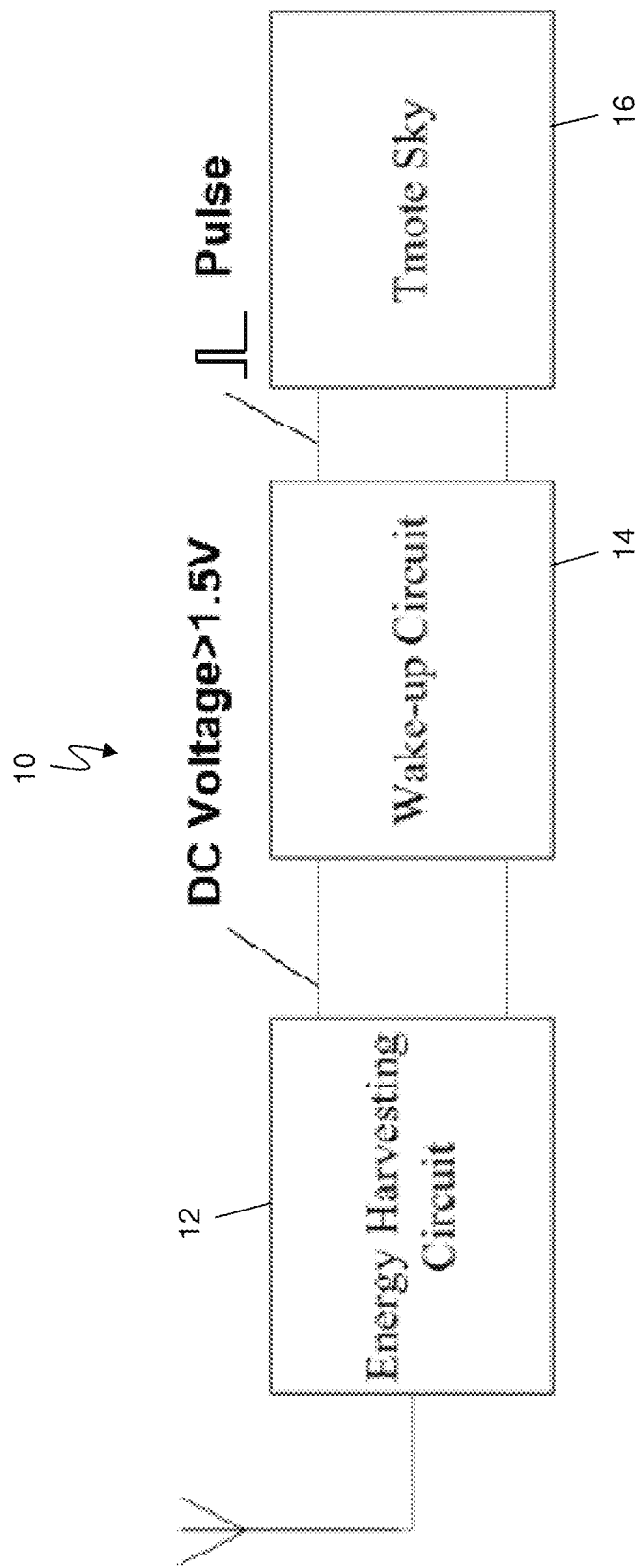
FIG. 1 is a block diagram of a wake-up radio sensor node according to the present invention.

Referring now to the drawings, wherein like reference numerals refer to like parts throughout, there is seen in FIG. 1 a new wake-up radio sensor node 10, which is herein termed a REACH-Mote (Range EnhAnCing energy Harvester-Mote). REACH-Mote comprises an energy harvesting circuit 12 combined with a wake-up circuit 14 for activating a low power wireless sensor module 16, such as a Tmote Sky Ultra low power IEEE 802.15.4 compliant wireless sensor module previously available from Moteiv Corp. of San Francisco, Calif.

Figure 2:
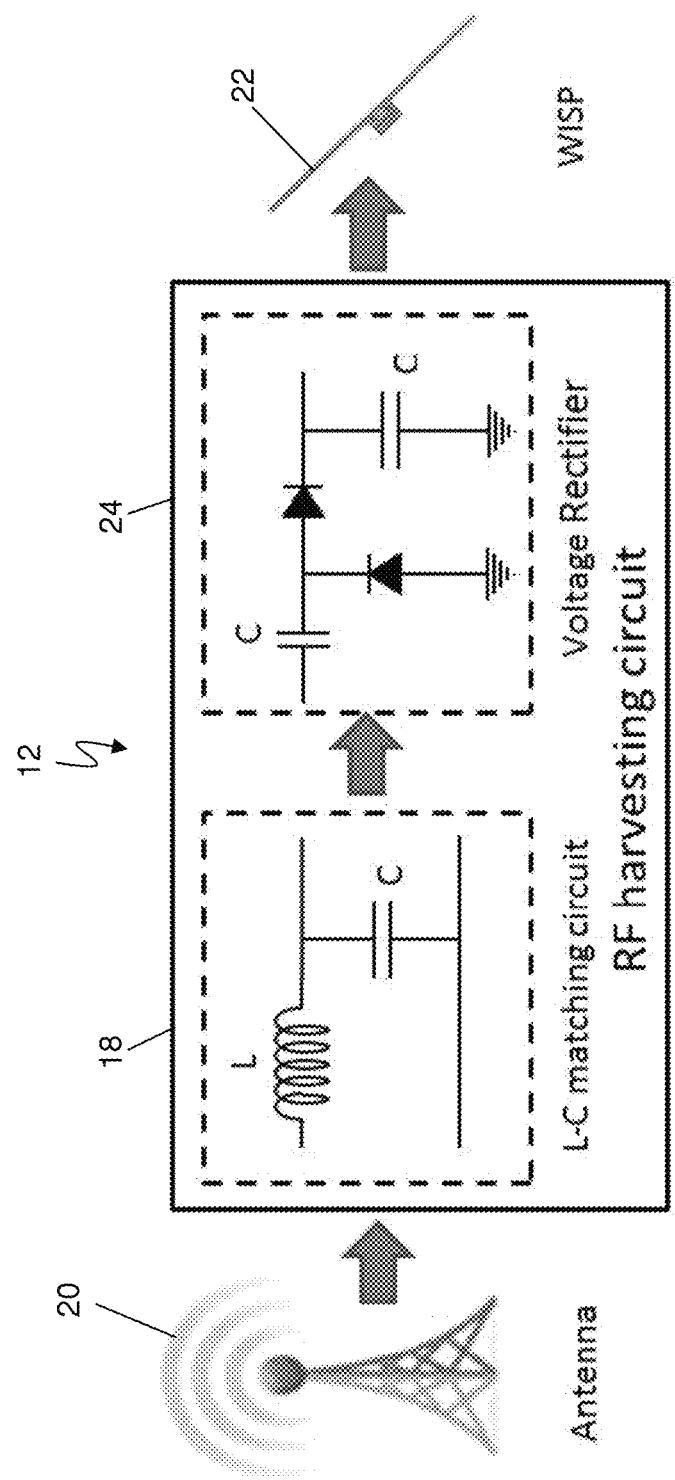
FIG. 2 is a schematic of an energy harvesting circuit for use with the present invention.
Figure 3:
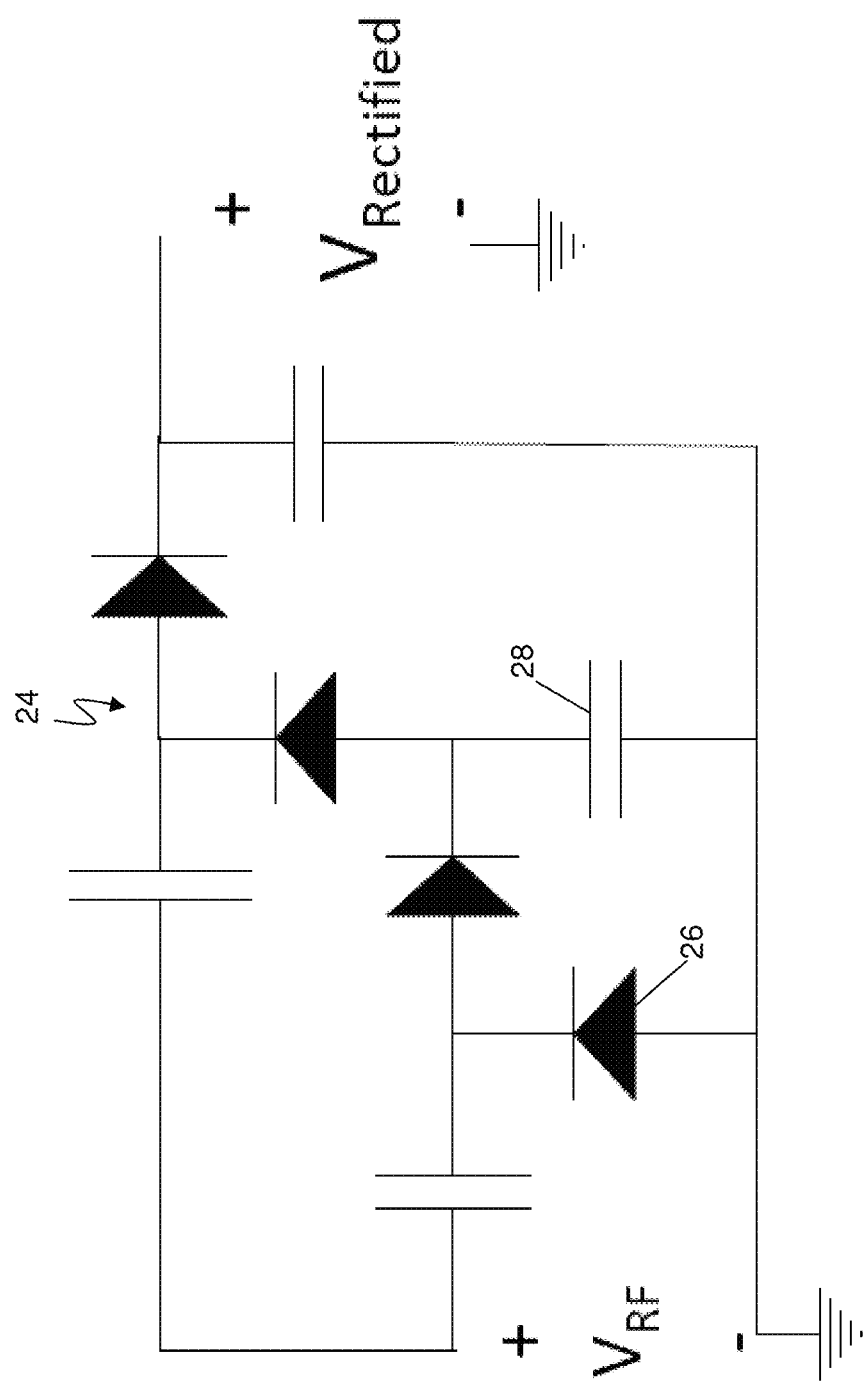
FIG. 3 is a schematic of a multiplier for use with the present invention.
Figure 4:
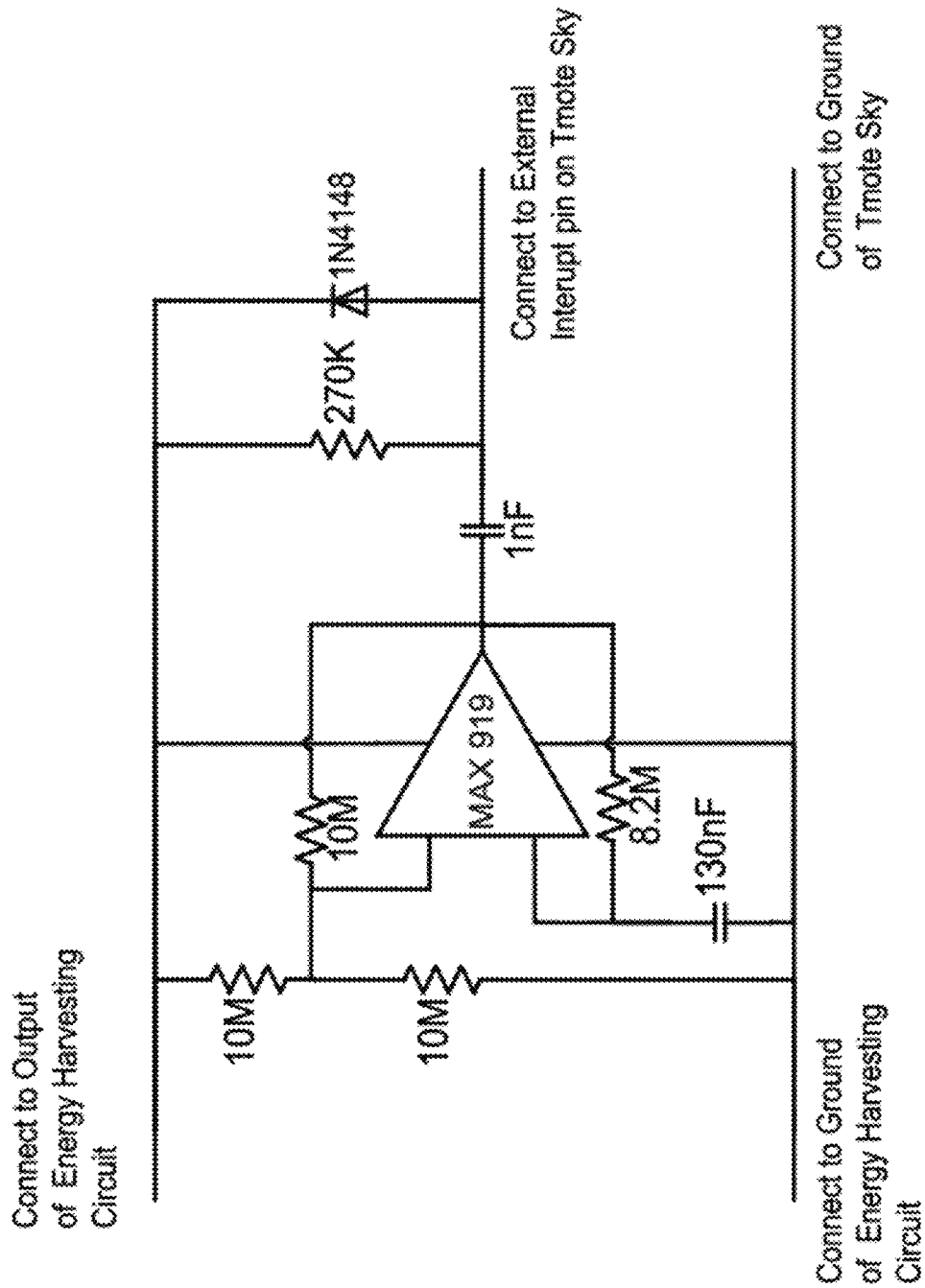
FIG. 4 is a schematic of a wake-up circuit for use with the present invention.

Energy harvesting circuit 12 can comprise any circuit that can harvest energy from a wireless signal. Preferably, as seen in FIG. 2, energy harvesting circuit 12 comprising a carefully tuned matching circuit 18 to balance the input impedance seen from an antenna side 20 to a circuit load 22 (such as a WISP and Tmote combination), as well as a voltage rectifier that functions as a multiplier 24. Referring to FIG. 3, multiplier 24 may be based on the classical Dickson's voltage multiplier circuit, which has a number of stages connected in parallel, each stage being a series combination of a diode 26 and a capacitor 28. Because capacitors 28 appear in parallel with respect to each other, the effective circuit impedance is reduced. Hence, this makes the task of matching the antenna 14 to the load side simpler.

As the peak voltage of the AC signal obtained at antenna 20 is generally much smaller than the diode threshold, diodes 26 with lowest possible turn on voltage are preferable. Moreover, since energy harvesting circuit 12 operates in the high MHz range, diodes 26 with a very fast switching time need to be used. Schottky diodes use a metal-semiconductor junction instead of a semiconductor-semiconductor junction. This allows the junction to operate much faster, and gives a forward voltage drop of as low as 0.15V. For example, diodes 26 may be obtained from Avago Technologies, HSMS-2852 that have a turn-on voltage of 150 mV, measured at 0.1 mA, may be used because this specific diode is suitable for operating in the low power region, typically considered as the range of power between −20 dBm and 0 dBm.

Figure 5:
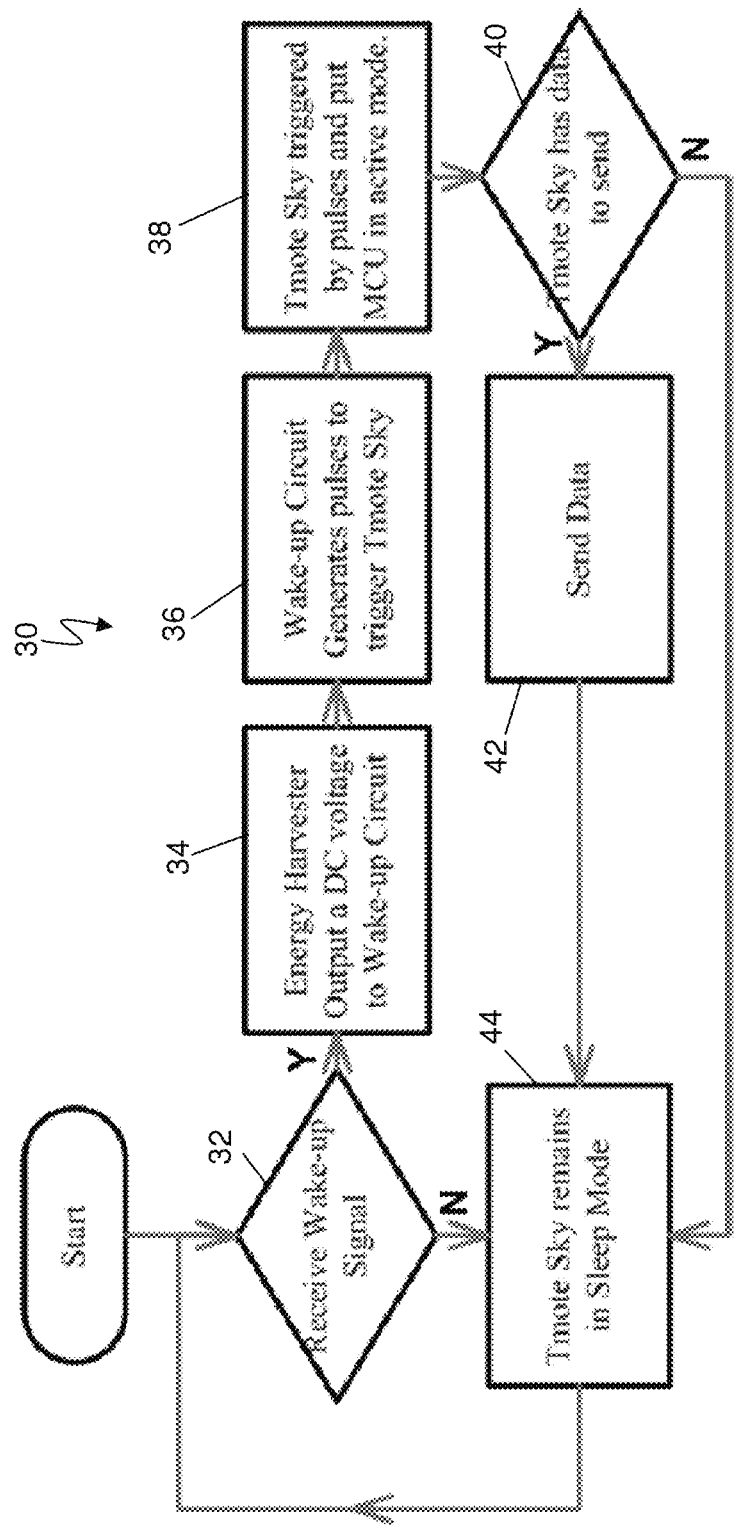
FIG. 5 is a flowchart of the processing steps of a wake-up radio sensor node according to the present invention.

REACH-Mote 10 works, as described in FIG. 5, by implementing a wake-up process 30 that begins with checking for receipt of a wake-up signal 32 and, if received, outputting a DC voltage to the wake-up circuit 34. Thus, the wake-up circuit REACH-Mote 10 is put in sleep mode before the WuTx transmits the wake-up signal, i.e., the MCU on the Tmote Sky, which is an MSP430F1611, is put to LPM3 sleep mode and the radio on the Tmote Sky is in the sleep mode. When a wake-up signal is sent by the WuTx, the energy harvesting circuit 12 outputs a DC voltage 34. The wake-up circuit then generates pulses to trigger Tmote Sky 36, which puts the MCU in active mode 38. Wake-up circuit 34 starts to generate the pulse once the DC voltage is higher than 1.5V, and this will trigger the mote and put the mote's MCU into active mode in 5 ms. A check is made for data to send 40, and if so the data is sent 42. After waking up, the data transfer is started if the mote has data to send. Once the data is sent 42, or if there is no data, the REACH-Mote goes back to sleep mode 44. In this work flow, energy harvesting circuit 12 is a passive component that does not consume energy from the sensor battery. Wake-up circuit 14 is powered by energy harvesting circuit 12, so wake-up circuit 12 also does not drain energy from the sensor battery. Thus, all of the energy provided by the battery of REACH-Mote 10 is used for sensing and data communication.

The monetary cost of REACH-Mote 10 of the present invention is thus lower than a WISP-Mote or WISP-Mote having an energy harvesting circuit alone (EH-WISP-Mote), as no expensive MCU or decoding components are used. As wake-up circuit 14 of REACH-Mote 10 of the present invention consumes much less energy than a WISP-Mote and EH-WISP-Mote, it enables REACH-Mote 10 to have an advantage in wake-up range and wake-up delay over these other designs.

In order to compare the performances of a REACH-Mote 10 of the present invention, several experiments were run in an open-space environment (an empty gymnasium). In the experiments, the transmitter (WuTx) was mounted 2 feet above the ground and the location of the wake-up receiver (WuRx) was varied in the horizontal (x-axis) and vertical (y-axis) directions with respect to the WuTx. For broadcast-based wake-up, the WuTx transmits a generic wake-up signal that activates any nearby receivers. After the WuRx receives the signal, it wakes up the Tmote Sky, which transmits a short data packet indicating the successful wake-up to the base station (a T-Mote Sky connected to a laptop via USB) located adjacent to the WuTx.

In the experiments, the response delay was measured. For a given WuRx location, (x,y), the WuTx is powered on and an initial time stamp is recorded on a laptop. The WuTx outputs a continuous wake-up signal until the mote wakes up and transmits to the base station, at which point the final time stamp is recorded. The time difference between these time stamps represents the wake-up delay. If the mote does not respond within 100 s, it is assumed that it cannot be woken up at that particular location.

The wake-up tests were performed in 2 foot increments in the x-direction starting from 0.1 feet away from the WuTx until the distance when no wake-up is observed within the delay limit of 100 s. Then the same process is repeated by increasing the vertical distance (y) by 1 foot. After each single measurement, the T-Mote Sky is reset using the onboard reset button and the energy harvesting circuit is discharged. For each location, five tests were performed, and the average of these five delay measurements is presented in the following result sections.

Figure 6:
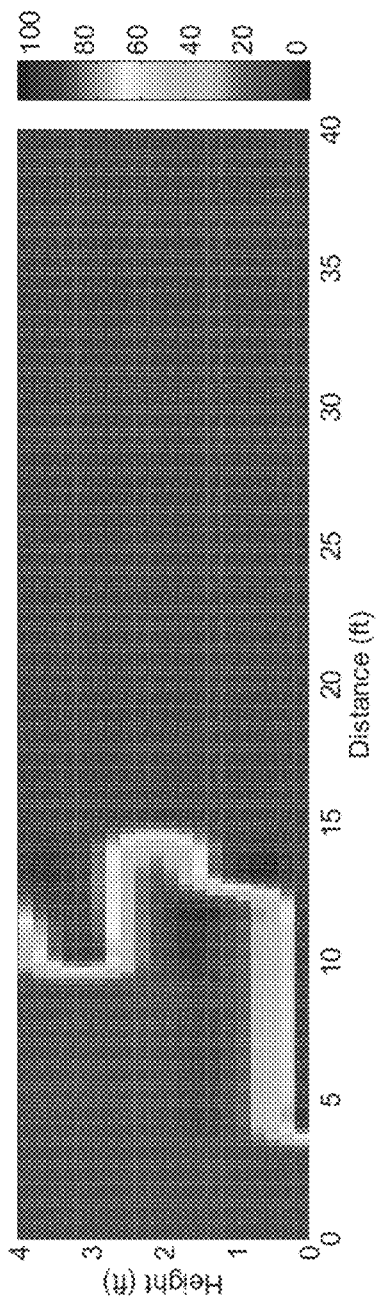
FIG. 6 is a graph of the ID-based wake-up delay (in seconds) for:(a) a WISP-Mote; and (b) a EHWISP-Mote, both of which are being woken up by an RFID Reader and Powercast combination with a delay limit of 100 second used to represent the no wake-up locations.
Figure 6:
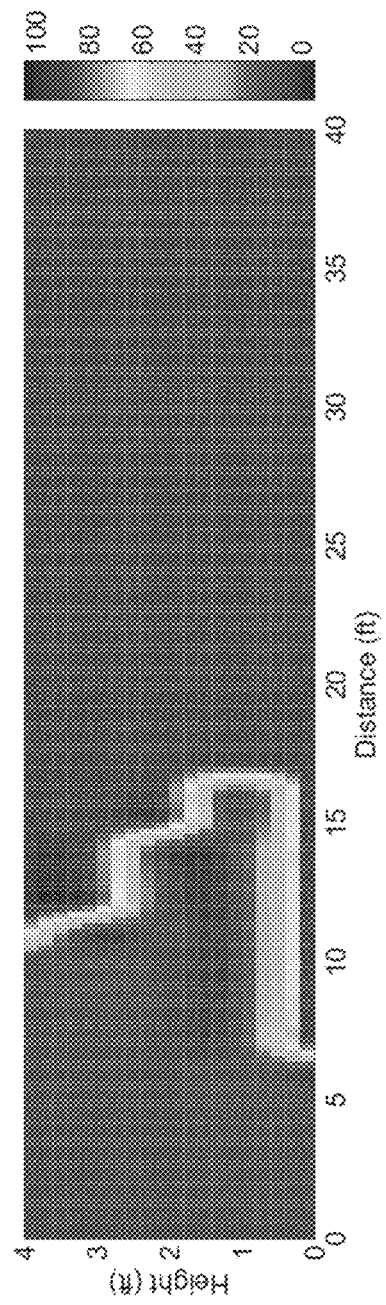

FIG. 6 shows the wake-up delay for EH-WISP-Mote and the WISP-Mote for ID-based wake-up. Comparing the performance of EH-WISP-Mote and the WISP-Mote, EH-WISP-Mote can reach a 17 foot wake-up range at a height of 1 foot above the ground, 3 feet further than the WISP-Mote's maximum wake-up range, representing a 20 percent improvement in the maximum wake-up range performance.

Figure 7I:
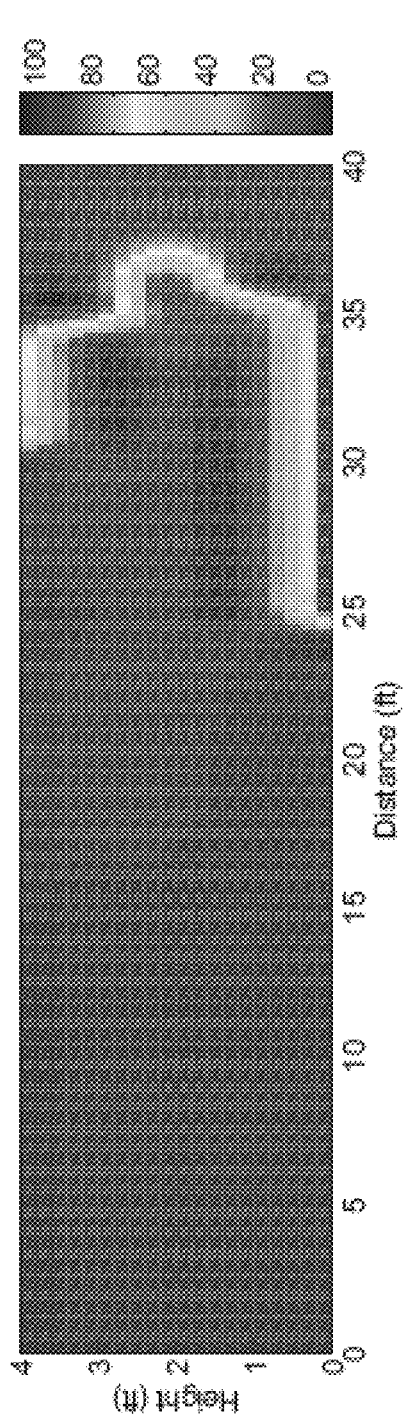

In another set of experiments, a broadcast-based wakeup was used and the performance of REACH-Mote 10, EH-WISP-Mote and the WISP-Mote was evaluated. For the WuTx, different combinations were used, including the Impinj RFID Reader, a Powercast transmitter, and a combination of the two. FIG. 7 shows the delay results for the different WuTx and WuRx options utilizing broadcast wake-up.

REACH-Mote 10 operating with the combined Reader-Powercast WuTx provides the overall best performance, achieving a wake-up range of 37 feet and covering an area almost three times that of the WISP-Mote and two times that of EH-WISP-Mote. This is due to the ultra low energy consumption of wake-up circuit 14. Moreover, the achieved distance represents an impressive range for a battery-less wake-up radio system, i.e., a passive WuRx. This is the longest known wake-up range achieved by a passive wakeup receiver. In addition, REACH-Mote 40 achieves the best delay results for any given location. As an example, when these three WuRxs are deployed at 5 feet from the WuTx, REACH-Mote 10 can be woken up on average within 235 ms, while EH-WISP-Mote can be woken up on average within 443 ms. The WISP-Mote has the longest wake-up delay, an average of 721 ms.

Figure 8:
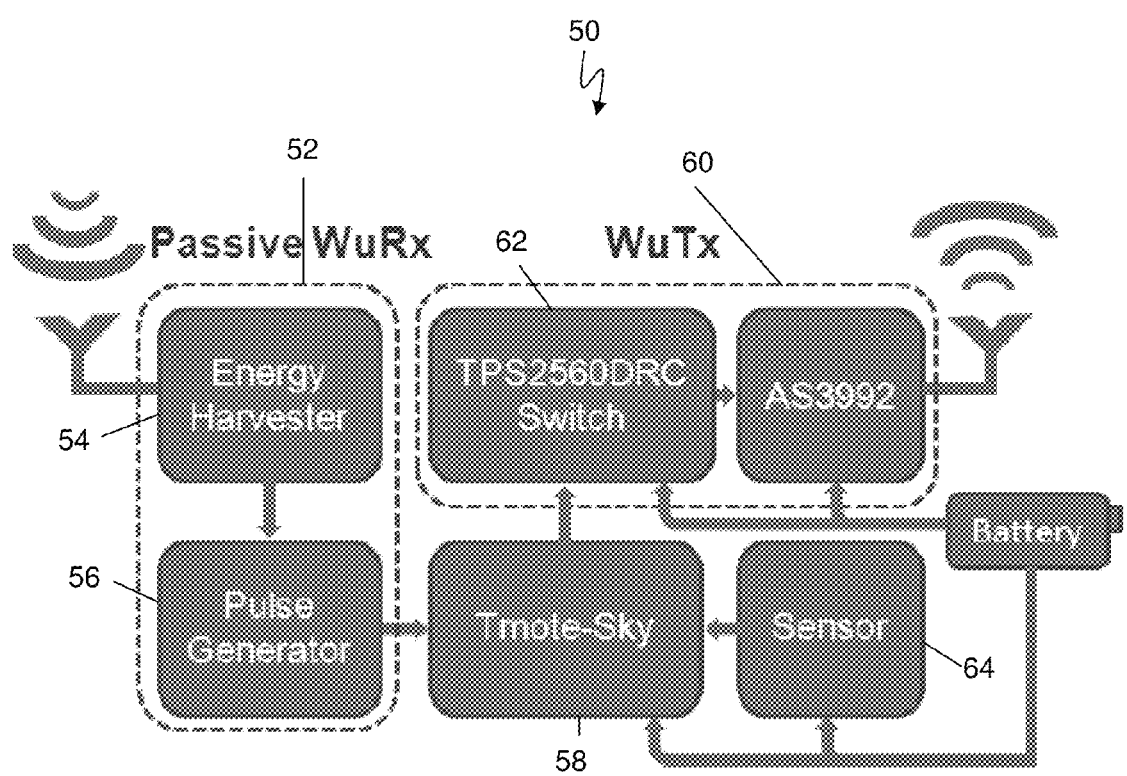
FIG. 8 is a schematic of a multi-hop wake-up radio sensor node according to the present invention.

REACH-Mote 10 may also be implemented as a multi-hop wake-up sensor node, referred to as MH-REACH-Mote 50. In order to achieve multi-hop wake-up, MH-REACH-Mote 50 must also include a WuTx component that can be triggered by the Tmote-Sky. The Tmote-Sky uses its digital I/O pins to control the WuTx's activity. The entire sensor node requires only one power source, shared by the Tmote-Sky and the WuTx. Due to this, it is necessary to use energy judiciously in both the Tmote-Sky and the WuTx to optimize the sensor's lifetime. As seen in FIG. 8, MH-REACH-Mote 50 comprises a passive WuRx 52 having an energy harvesting circuit 54 combined with a wake-up circuit 56 for activating a low power wireless sensor module 58, such as a Tmote Sky. MH-REACH-Mote 50 further comprises a WuTx 60 controlled by Tmote-Sky 58 through a TI TPS2560DRC switch 62. MH-REACH-Mote 50 further comprises a sensor node 64, such as an AMS AS3992 UHF RFID Reader, which is a low power, single chip solution. Moreover, it provides the option of building an ID-based wake-up radio solution based on an RFID protocol, leaving the door open for the implementation of a secure, ID-based passive wake-up radio system.

Figure 9:
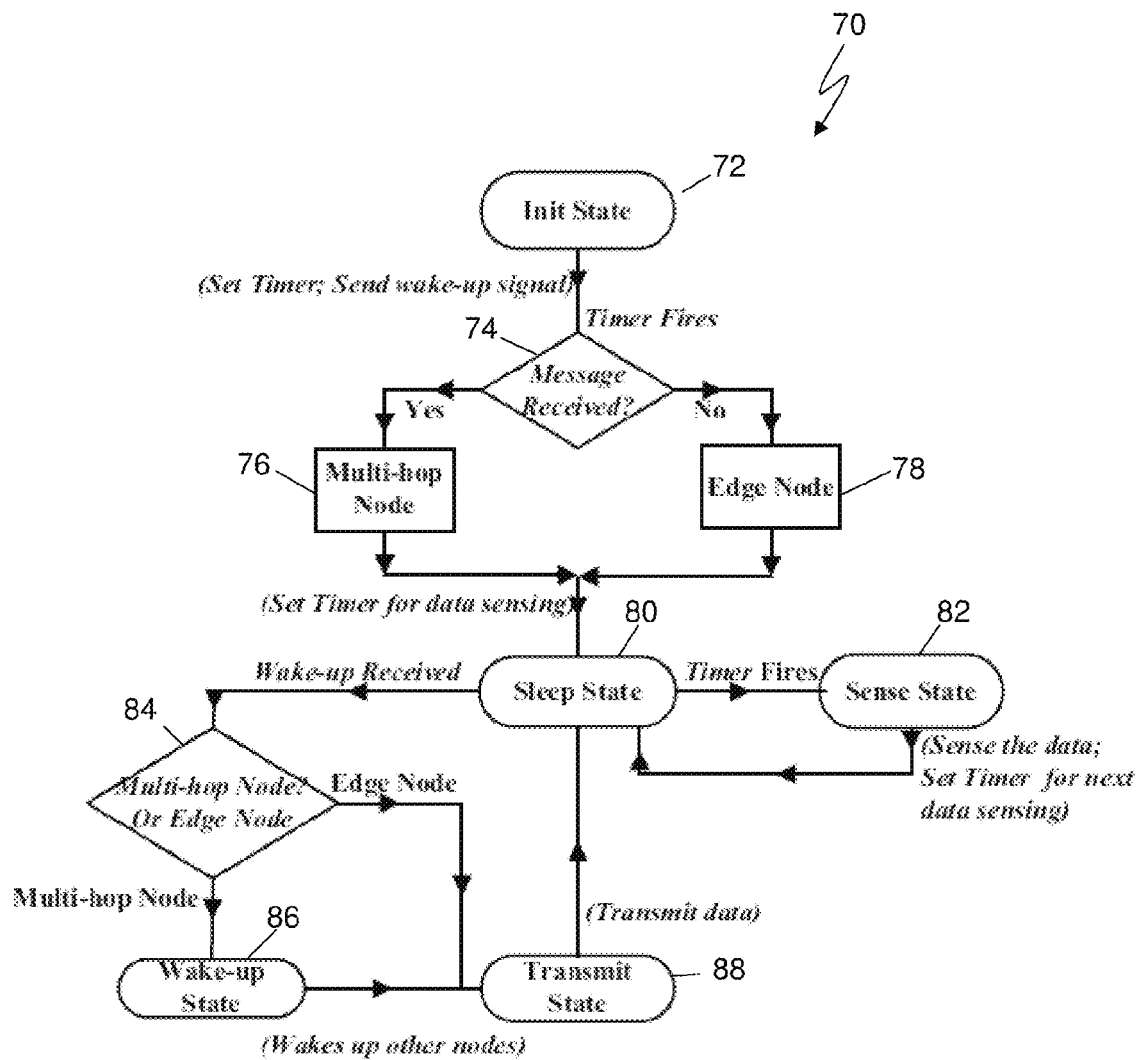
FIG. 9 is a flowchart of the processing steps for a multi-hop wake-up radio sensor node according to the present invention.

Since a WSN equipped with wake-up radios does not need a complex MAC protocol, MH-REACH-Mote 10 in a multi-hop passive wake-up sensor network is designed to operate a state process 70 as seen in FIG. 9. When first deployed, MH-REACH-Mote 50 powers up and goes into the initialization, or Init, state 72. In the Init state 72, MH-REACH-Mote 50 sends a wake-up signal out through its WuTx, attempting to wake up other nearby nodes. A timer is set to fire at the end of the wake-up signal transmission period. Simultaneously, the radio on the Tmote-Sky is set to receiving mode, and listens for incoming messages 74. If a packet is received before the timer fires, MH-REACH-Mote 50 is defined as a multi-hop node 76. Otherwise, it is defined as an edge node 78, which is a node located at the edge of the network and hence does not need to send a wake-up signal to any other node. Next, MH-REACH-Mote 50 sets a timer for data sensing and enters into the sleep state 80. MH-REACH-Mote 50 will remain in the sleep state until either the timer for sensor data fires, or it receives a wake-up signal from its WuRx. When the timer for sensor data fires, MH-REACH-Mote 50 enters into the sense state 82, and collects and stores the new data in memory. MH-REACH-Mote 50 then returns back to sleep state 80. When MH-REACH-Mote 50 receives a wake-up signal from its WuRx, a decision is made to whether it is a multi-hop or edge node node 84, and MH-REACH-Mote 50 enters into a wake-up state 86 if MH-REACH-Mote 50 is a multi-hop node. Otherwise, if MH-REACH-Mote 50 is an edge node, it enters directly into a transmit state 88. MH-REACH-Mote 50 that entered into a wake-up state 86 transmits a wake-up signal through its WuTx to wake up other MH-REACH-Motes 50 (or REACH-Motes 10). Then, MH-REACH-Mote 50 enters into transmit state 88. MH-REACH-Mote 50 in transmit state 88 will send its own stored data to the sink. After sending the data in transmit state 88, MH-REACH-Mote 50 returns to sleep state 80.

Two sets of field tests were performed to evaluate the performance of MH-REACH-Mote 50. In the first set of tests, two MH-REACH-Motes 50 were placed 2 feet above the ground. Both the transmitting node and the receiving node were connected to a S9028PCR circular polarity RFID panel antenna with a gain of 9 dBiC, where dBiC (isotropic circular) is the forward gain of an antenna compared to a circularly polarized isotropic antenna. The maximum wake-up range was measured with different durations of wake-up signal transmissions, varying from 30 ms to 10 s. 30 ms is the time for a Tmote-Sky to transmit 12 bytes of data. Hence, MH-REACH-Mote 50 can spend the time that the node is already awake transmitting the wake-up signal. Also, given timer inaccuracies, it is difficult to wake up the mote for less than 30 ms.

A longer wake-up signal transmission provides more energy to the receiving node and does achieve a slightly longer wake-up range. However, this comes at the cost of increased energy consumption at the transmitting node, due to the extended time the wake-up signal is being sent. The purpose of this set of tests was to characterize the relationship between the duration of the wake-up signal transmission and the wake-up range.

The second set of field tests evaluated the multi-hop performance of MH-REACH-Mote 50 when it cooperated with a mobile base-station moving along a pre-designed path. This is a realistic scenario such as when a car, which acts as a data mule, drives along the road and wakes up the sensor nodes deployed on the side of the road (e.g., on mailboxes, on street signs, etc.). After a sensor node along the side of the road is woken up, it transmits a signal to wake up a node located further away (e.g., on a house or building nearby). Then, the node sends the data to the data mule. The base-station we used was a combination of an Impinj RFID reader [16] and a Powercast energy transmitter. Based on our previous work, the WuRx on a REACH-Mote can be triggered at a distance of 37 feet from the base-station within 120 seconds. In order to ensure a quick wake-up within 5 seconds, we deploy the MH-REACH-Mote 35 feet from the moving path of the base-station to ensure a stable and quick wake-up. In this field test, the mobile base-station moves along the path to wake up the first MH-REACH-Mote when it comes close to it. After this MH-REACH-Mote is woken up, it acts as a multi-hop node and wakes up a second, farther MH-REACH-Mote. As the base-station can continuously transmit energy, this can pre-charge the WuRx on the second-hop MH-REACH-Mote before the first-hop MH-REACH-Mote starts transmitting the wake-up signal. Thus, the base-station can potentially improve the wake-up range of the second-hop MH-REACH-Motes 50.

Table I shows the maximum wake-up range achieved by MH-REACH-Mote 50 in the first set of field tests. The measurements shown correspond to the average of three sets of measurements with a variance less than 0.5 ft. The results show that the maximum wake-up range is 31 ft, achieved when the wake-up signal was transmitted for 10 seconds. The 30 ms wake-up signal transmission uses the least energy, but can achieve a wake-up range of 29 ft. Table I also shows the relationship between the wake-up range and the energy consumption we measured on MH-REACH-Mote 50 for each wake-up transmission duration. Even when the MH-REACH-Mote 50 is only turned on for 30 ms, which costs only 0:11 J energy, the wake-up distance is 29 ft by using the WuRx's high efficiency energy harvesting module and high gain directional antenna. Increasing the wake-up signal duration from 30 ms to 2 s does not increase the wake-up distance as the AS3992 in the WuTx transmits a high energy pulse along with a Query command in the beginning of the transmission according to the RFID protocol. After the high energy pulse, the AS3992 lowers its energy transmission and waits for a couple of seconds and transmits another pulse. Thus, increasing the signal duration more than 300 times to 10 s, with a cost of 23:54 J, which cost 214 times additional energy compare to a 30 ms signal, only increases the wake-up range by two feet, or about 6%, which may not be a good trade-off for several applications. However, for some applications that require a maximum wake-up range, the node lifetime may be traded off to achieve an optimized wake-up range.

Figure 10:
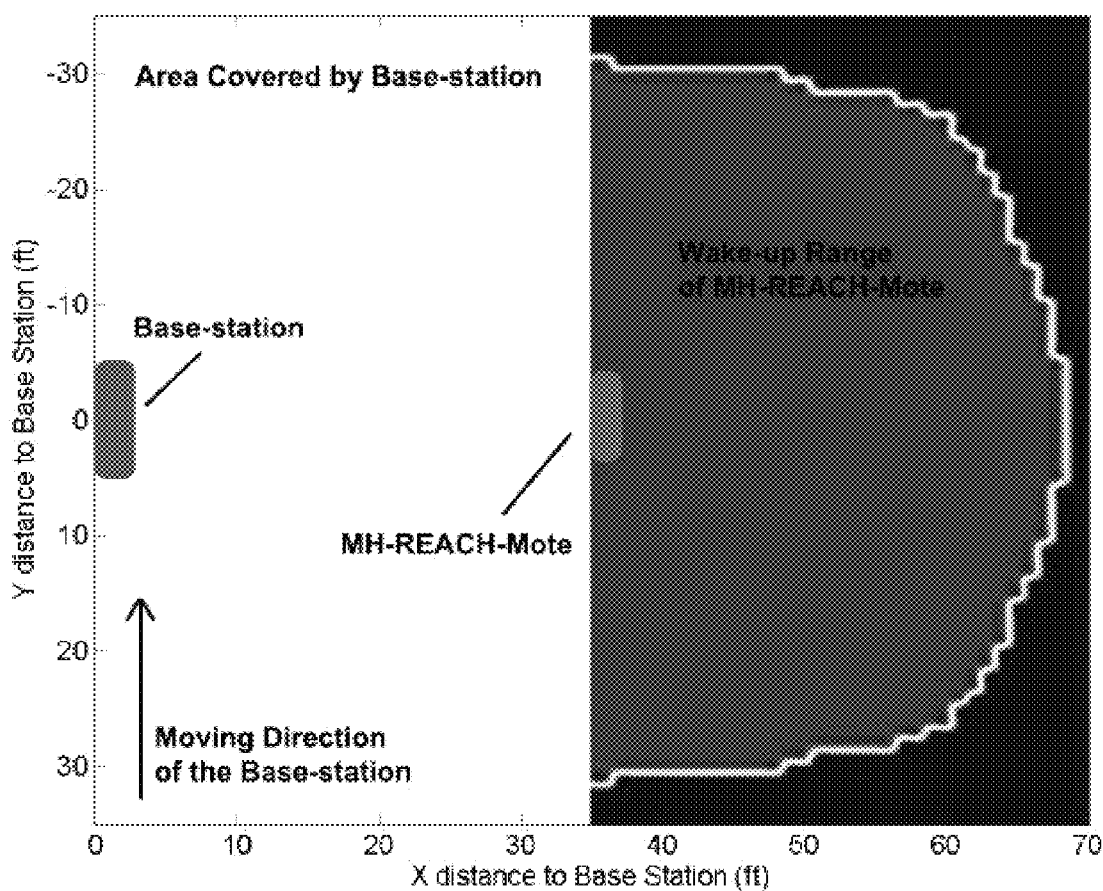
FIG. 10 is a graph of the wake-up range of a multi-hop wake-up radio sensor node according to the present invention.

FIG. 10 shows the wake-up range results of the second set of field tests. In this test, the mobile base-station moves towards the direction indicated in FIG. 10, transmitting a constant wake-up signal along its path. MH-REACH-Mote 50 along the moving path of the base-station is woken up by the base-station and transmits a wake-up signal with a constant duration of 30 ms to wake up a second MH-REACH-Mote 50. The maximum wake-up range between the first hop MH-REACH-Mote 50 and the second hop MH-REACH-Mote 50 is 34 feet, which represents a 5 foot (17% improvement) increase with the assistance of the base-station compared to the previous result with a 30 ms wake-up signal. This result is achieved when the base-station and two MH-REACH-Mote 50 are all aligned in a straight line. Additionally, with the assistance of the base-station, the wake-up range is always above 31 feet. This minimum wake-up range of 31 feet corresponds to the case when the base-station is horizontally aligned with the first MH-REACH-Mote 50, and the second MH-REACH-Mote 50 is vertically aligned with the first one.

As shown in Table 1, the maximum wake-up distance increased as the duration of the wake-up signal transmission is increased. Since the WuRx is powered by the energy harvested from this transmission, a longer transmission leads to an extended wake-up range. However, extended signal transmission consumes a significant amount of energy, decreasing the lifetime of the MH-REACH-Mote. Hence, it is important to balance the maximum wake-up range with the energy consumption.

TABLE 1

| Wake-up Signal Duration | 30 ms | 100 ms | 500 ms | 1 s |
|---|---|---|---|---|
| Wake-up Range (ft) | 29 | 29 | 29 | 29 |
| Energy Consumption (J) | 0.11 | 0.29 | 1.35 | 2.41 |
| Wake-up Signal Duration | 2 s | 3 s | 5 s | 10 s |
| Wake-up Range (ft) | 29 | 30 | 30 | 31 |
| Energy Consumption (J) | 4.66 | 7.36 | 12.54 | 23.54 |

To calculate the node lifetimes, we assume that the MH-REACH-Mote is powered by 2 AA batteries and each battery can provide 1800 mAh. Also, we assume that the nodes are waking up other nodes every 4 hours. Under these assumptions, Table II shows the node lifetime for the different wake-up ranges.

TABLE 2

| Wake-up Signal Duration | 30 ms | 3 s | 10 s |
|---|---|---|---|
| Wake-up distance (ft) | 29 | 30 | 31 |
| Node Lifetime (days) | 5376 | 413 | 134 |

Figure 11:
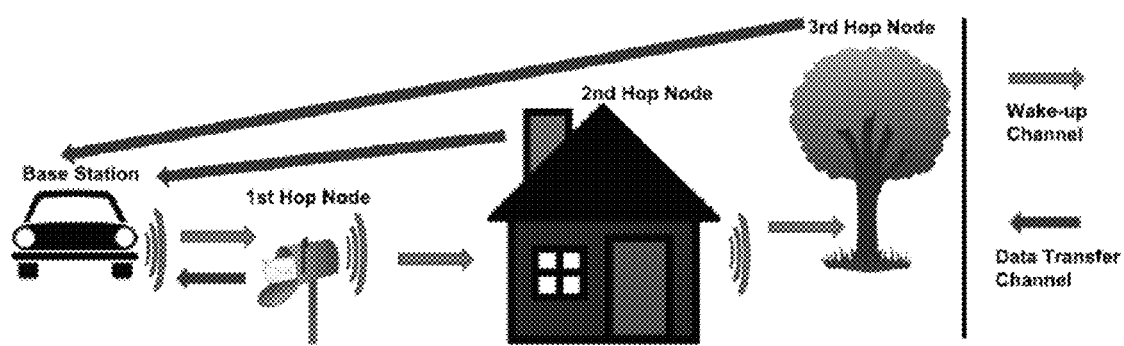
FIG. 11 is a schematic of a scenario for use of a multi-hop wake-up radio sensor node according to the present invention.
Figure 12:
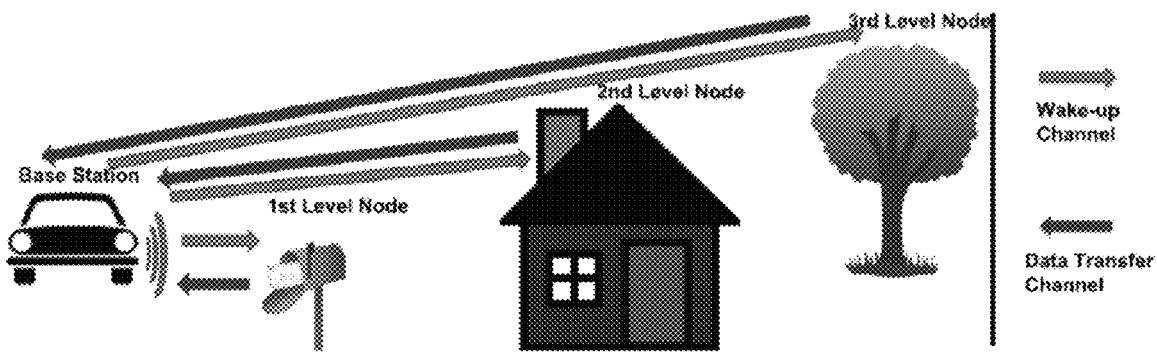
FIG. 12 is a schematic of a scenario for use of a multi-hop wake-up radio sensor node according to the present invention.

As shown in Table 2, since a wake-up range of 29 ft only requires the WuTx to be transmitting the wake-up signal for 30 ms, the node can remain operational for more than 5000 days, achieving a lifetime of more than 14 years. However, as the wake-up range requirements increase, the node lifetime decreases dramatically. If a node needs to achieve a wake-up range of 31 ft, the node lifetime decreases to 134 days, which may still be an acceptable node lifetime for some applications. Note that the energy cost of the data sensing as well as the battery leakage are ignored in the evaluation. In order to determine the benefit of multi-hop passive wake-up in the context of a wireless sensor network, the performance of an MH-REACH-Mote network is compared with that of a network that consists of active wake-up radio motes described in with 65 µW energy consumption. It is assumed that nodes in the network are deployed on the mailbox, house and trees along a road, as shown in FIGS. 11 and 12. A mobile car, working as a base station, drives along the road to wake up each node and collect data, for example, air pollution data.

For the MH-REACH-Mote scenario, all MH-REACH-Motes 50 are in the sleep mode most of the time. The mobile car, working as a data sink, continuously sends a wake-up signal to wake up the MH-REACH-Motes around it while driving along the road. After the first-hop MH-REACH-Motes, located on the mailbox, are woken up, they transmit a wake-up signal to the second-hop, farther MH-REACH-Motes deployed on the house. Then, the second-hop MH-REACH-Motes transmit the wake-up signal to the third-hop MH-REACH-Motes located on nearby trees. After the nodes are woken up, they transmit their data directly back to the mobile car (since the transmission range of the radio ensures that even the nodes in the third level can reach the mobile car directly). FIG. 11 shows the working scenario using MH-REACH-Motes.

For the active wake-up radio network scenario, the nodes are also in the sleep mode most of the time. However, during this time in the sleep mode, the active WuRx is dissipating a constant 65 µW. The mobile car sends a wake-up signal along the road, which wakes up all three sensor nodes on the mailbox, house and trees. After the sensor nodes are woken up, they send their data to the mobile car. FIG. 12 shows the working scenario for this active wake-up. For both scenarios, it is assumed that no collisions occur during the data transmission, all sensor nodes are located within the communication range of the data sink, all sensor nodes in the active wake-up scenario are located within the wake-up range of the data sink, all nodes return to the sleep mode once they finish their data transmissions, the data sink does not have any energy constraints, and each node is powered by 2 AA batteries with 1800 mAh energy. Table 3 below shows the energy consumption of the different components of the MH-REACH-Mote and the active radio wake-up radio mote.

TABLE 3

| Operation | Average current consumption | Duration |
| --- | --- | --- |
| Tmote-Sky transmit 12 byte packet | 18.35 mA | 30 ms |
| Tmote-Sky in sleep mode | 11.2 µA | Continuous |
| MH-REACH-Mote send wake-up signal | 1.25 A | 30 ms |
| Current leakage of TI TPS2560DRC switch | 0.1 µA | Continuous |
| Active wake-up | 65 µW | Continuous |

Figure 13:
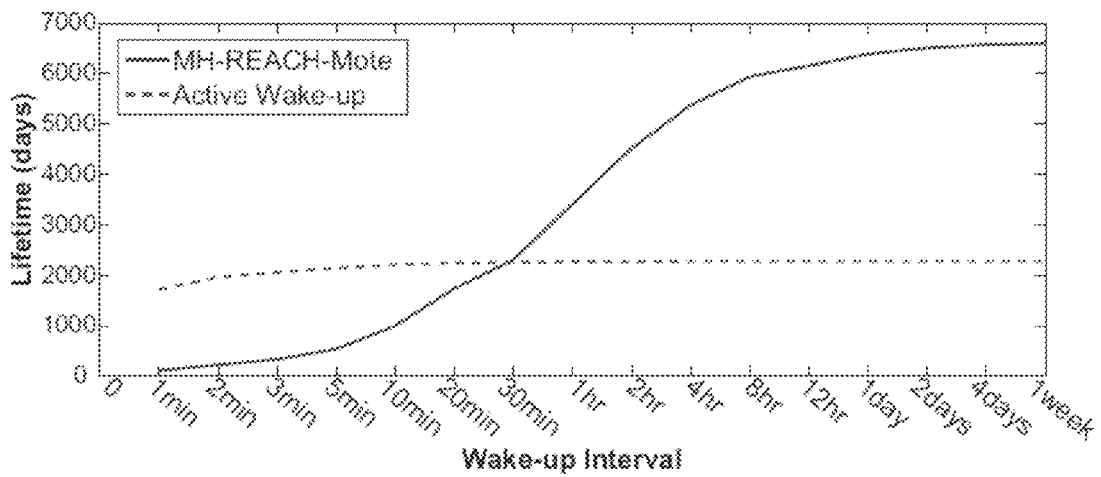
FIG. 13 is a graph of the lifetime of a multi-hop wake-up radio sensor node according to the present invention.

FIG. 13 shows the network lifetime for different intervals between two wake-up events. As the TI TPS2560DRC switch on the MH-REACH-Mote's WuTx only leaks 0.1µA from the battery during the sleeping period, MH-REACH-Mote 50 can achieve great energy efficiency compared to the active WuRx approach as the interval between two wake-up events increases. MH-REACH-Mote 50 can achieve longer lifetime than active wake-up for average idle intervals of 30 minutes or more, which is a common scenario for a sensor network with regular data collection such as daily temperature/moisture collection and air pollution monitoring. Further increasing the interval between data collection to a week extends the network lifetime to 6600 days, which represents almost three times the network lifetime of the active wake-up radio sensor network. As the energy cost of the data sensing as well as the battery leakage are ignored in the calculation, the actual lifetime for node in the application could be potentially less than this calculation. Also, the increasing rate of the node lifetime goes down with an increase in the wake-up interval for longer wake-up intervals. This is because a greater portion of the energy is consumed by the Tmote-Sky during the sleep period when the wake-up interval is long.

Figure 14:
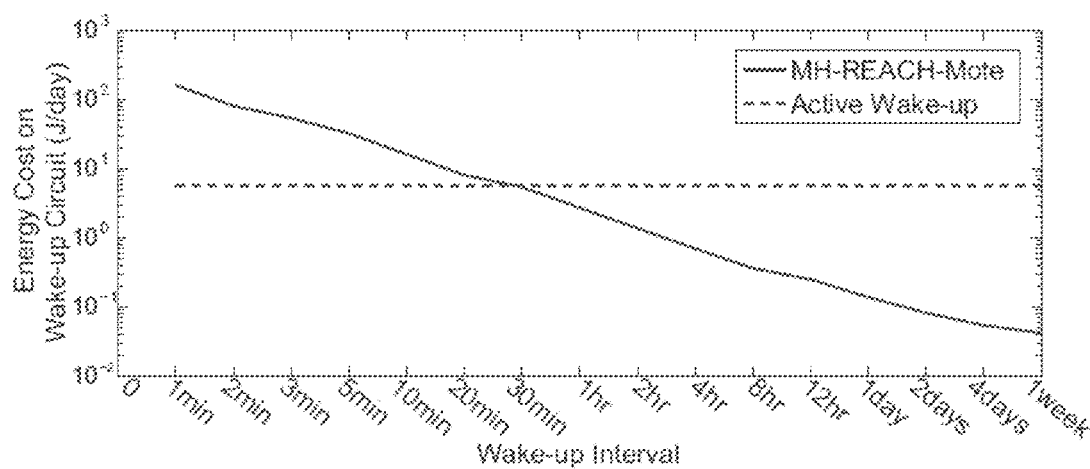
FIG. 14 is a graph of the energy cost of a multi-hop wake-up radio sensor node according to the present invention.

As the network lifetime is affected by the energy consumption of the Tmote-Sky, the average energy cost from the wake-up circuit for both scenarios (MH-REACH-Mote and active wake-up) may be evaluated, i.e., the energy cost of the Tmote-Sky is not included. The results are shown in FIG. 14. The results show that the WuTx circuit on the MH-REACH-Mote consumes less energy than that of the active wake-up receiver for intervals of 30 minutes and longer. If the interval between data collection is a week, the average energy cost of the MH-REACH-Mote's WuTx circuit decreases to as low as 0.04 J/day, which is about 140 times less than that of the active wake-up radio mote.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A wake-up radio sensor node, comprising:
   an energy harvesting circuit for collecting energy from a wireless signal and outputting a voltage based on said collected energy;
   a wake-up circuit comprising a wake-up pulse generator interconnected to said energy harvesting circuit for receiving said output voltage of said energy harvesting signal and using said output voltage to generate a wake-up signal;
   a wireless sensor having a sleep mode and an active mode interconnected to said wake-up circuit to receive said wake-up signal, wherein said sensor is programmed to enter said active mode from said sleep mode in response to receiving said wake-up signal; and
   a power source interconnected to said wireless sensor.

2. The node of claim 1, wherein said wake-up pulse generator generates said wake-up signal after said voltage exceeds a predetermined threshold.

3. The node of claim 2, wherein predetermined threshold is 1.5 volts.

4. The node of claim 1, wherein said wireless sensor is programmed to send any data when said wireless sensor enters said active mode from said sleep mode.

5. The node of claim 4, wherein said wireless sensor is programmed to enter said sleep mode after sending data when in said active mode.

6. The node of claim 1, wherein said power source only supplies power to said wireless sensor for sensing and data communication.

7. A multi-hop wireless wake-up radio sensor node, comprising:
   an energy harvesting circuit for collecting energy from a wireless signal and outputting a voltage based on said collected energy;
   a wake-up circuit comprising a wake-up pulse generator interconnected to said energy harvesting circuit for receiving said output voltage of said energy harvesting signal and using said output voltage to generate a wake-up signal;
   a wireless sensor interconnected to said wake-up circuit to receive said wake-up signal and configured to output a node wake-up signal when said wake-up signal is received;
   a wireless transmitter interconnected to said wireless sensor module for transmitting said node wake-up signal; and
   a power source interconnected to said wireless sensor module and said wireless transmitter.

8. The node of claim 7, wherein said wireless transmitter comprises a radio-frequency identification reader and a dual-channel power distribution switch.

9. The node of claim 7, wherein said wireless sensor includes a timer for counting a predetermined period of time that commences after said node wake-up signal is transmitted.

10. The node of claim 9, wherein said wireless sensor is programmed to receive data from a nearby node before said predetermined period of time elapses.

11. The node of claim 10, wherein said wireless sensor is set to a multi-hop mode if data is received from a nearby node prior to said predetermined period of time elapsing.

12. A method of extending the wake-up range of a radio sensor node, comprising the steps of:
   using an energy harvesting circuit to collect energy from a wireless signal;
   outputting a voltage based on said collected energy;
   using said output voltage to generate a wake-up signal;
   providing said signal to a wireless sensor having a sleep mode and an active mode; and
   wherein said sensor enters said active mode from said sleep mode in response to receiving said wake-up signal.

13. The method of claim 12, further comprising the step of supplying power to just said wireless sensor from a power source.

14. The method of claim 12, wherein said wake-up signal is generated after said voltage exceeds a predetermined threshold.

15. The method of claim 14, wherein predetermined threshold is 1.5 volts.

16. The method of claim 15, wherein said wireless sensor transmits data after said wireless sensor enters said active mode from said sleep mode.

17. The method of claim 15, wherein said wireless sensor enters said sleep mode after sending data in said active mode.

* * * * *